United States Patent
Lahaye et al.

(10) Patent No.: US 9,890,743 B2
(45) Date of Patent: Feb. 13, 2018

(54) METHOD AND DEVICE FOR ELIMINATING HYDROCARBON VAPOURS FOR A VEHICLE

(71) Applicant: RENAULT S.A.S, Boulogne-billancourt (FR)

(72) Inventors: Belen Lahaye, Maule (FR); Pascal Pignon, Etrechy (FR); Gilbert Jain, Soulaires (FR); Caroline Lapierre, Itteville (FR); Thierry Prunier, L Hay les Roses (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 10 days.

(21) Appl. No.: 15/110,235

(22) PCT Filed: Nov. 19, 2014

(86) PCT No.: PCT/FR2014/052957
§ 371 (c)(1),
(2) Date: Jul. 7, 2016

(87) PCT Pub. No.: WO2015/104468
PCT Pub. Date: Jul. 16, 2015

(65) Prior Publication Data
US 2016/0326989 A1    Nov. 10, 2016

(30) Foreign Application Priority Data
Jan. 7, 2014    (FR) ................................. 14 50076

(51) Int. Cl.
*F02M 25/08*    (2006.01)
*F02D 29/02*    (2006.01)
(Continued)

(52) U.S. Cl.
CPC ............ *F02M 25/08* (2013.01); *F02D 29/02* (2013.01); *F02D 41/0032* (2013.01);
(Continued)

(58) Field of Classification Search
CPC ............... F02M 25/08; F02M 25/0809; F02M 25/0854; F02M 25/0836; F02D 29/02;
(Continued)

(56) References Cited

U.S. PATENT DOCUMENTS 5,150,689 A * 9/1992 Yano ................... F02M 25/0809
                                                  123/198 D
5,962,927 A   10/1999 Inada et al.
(Continued)

FOREIGN PATENT DOCUMENTS

FR    2 990 163 A1    11/2013
FR    2 990 175 A1    11/2013

OTHER PUBLICATIONS

International Search Report dated Jan. 16, 2015 in PCT/FR2014/052957 Filed Nov. 19, 2014.
(Continued)

*Primary Examiner* — Hieu T Vo
(74) *Attorney, Agent, or Firm* — Oblon, McClelland, Maier & Neustadt, L.L.P.

(57) ABSTRACT

A method for eliminating hydrocarbon vapors generated in a fuel tank of a vehicle powertrain including at least one heat engine, by a canister adapted to absorb the vapors. The method includes detecting movements of the hydrocarbon vapors from the tank to the canister, increasing a counter value when the vapors move from the tank to the canister, and calculating a number of gas volumes passing through the canister when the heat engine is started so as to reduce the value of the counter by purging the gasoline vapors in a direction of the engine.

10 Claims, 4 Drawing Sheets

(51) Int. Cl.
*F02N 11/08* (2006.01)
*F02D 41/00* (2006.01)
*F02D 41/24* (2006.01)

(52) U.S. Cl.
CPC ..... *F02D 41/0045* (2013.01); *F02D 41/2403* (2013.01); *F02M 25/0836* (2013.01); *F02N 11/0829* (2013.01); *Y02T 10/48* (2013.01)

(58) Field of Classification Search
CPC .. F02D 41/00; F02D 41/0045; F02D 41/0032; F02D 41/2403; Y02T 10/48
See application file for complete search history.

(56) References Cited

U.S. PATENT DOCUMENTS

| | | | |
|---|---|---|---|
| 7,107,971 B2* | 9/2006 | Spink | B60K 15/03519 |
| | | | 123/518 |
| 8,443,787 B2 | 5/2013 | Schondorf et al. | |
| 9,709,007 B2* | 7/2017 | Dudar | F02M 25/0854 |
| 2008/0271718 A1 | 11/2008 | Schondorf et al. | |
| 2009/0070001 A1 | 3/2009 | Takakura et al. | |
| 2010/0307464 A1 | 12/2010 | Schondorf et al. | |

OTHER PUBLICATIONS

French Search Report dated Sep. 29, 2014 in FR 1450076 Filed Jan. 7, 2014.

* cited by examiner

METHOD AND DEVICE FOR ELIMINATING HYDROCARBON VAPOURS FOR A VEHICLE

The invention concerns a hydrocarbon vapor elimination method and device for a vehicle powertrain, notably for a hybrid motor vehicle powertrain.

Emissions caused by evaporation of the fuel of vehicles is harmful to health and produces gasoline odors that are a nuisance for users. To overcome such nuisances, many vehicles are now equipped with gasoline vapor absorbers commonly known nowadays as "canisters" in the technical field concerned. With a view to employing French terminology in the French text, the French term "flacon" is used therein instead of "canister".

In the case of hybrid drives, during purely electrical use of the vehicle, if the gasoline vapor absorber or canister is breached or saturated, it is necessary to start the heat engine to purge it, but estimating the state of charge of the canister is difficult. By breached is meant a state of the canister in which the gasoline vapors passing through it can no longer be absorbed and escape to the atmosphere via its air vent.

In the case of non-hybrid drives, the fact that the canister is charged is detected with the engine running by the richness deviation observed by the oxygen probe when the purge valve is opened. On hybrid engines it is required to minimize starting the heat engine because the benefit of the hybrid technology is to emit as little polluting gas as possible and to consume as little fuel as possible.

The document U.S. Pat. No. 8,443,787 describes a gasoline vapor absorber canister purge method for activating a purge when the heat engine is running as a function of conditions in the fuel tank. The methods disclosed before now are suitable for a hybrid drive in which the heat engine is run regularly but give rise to numerous problems, notably in the case of a plug-in hybrid drive, which can sometimes go as far as the heat engine being started virtually never or only very rarely.

To solve the problems of the prior art, the method and the device described aim to provide an estimate of the canister charge that is sufficiently reliable to limit the number of starts to just what is necessary. This makes it possible to limit wear of the heat engine, $CO_2$ emissions and fuel consumption.

The benefit is all the greater in the case of a plug-in hybrid drive as the installed high autonomy in all-electric mode is the cause of prolonged purely electrical usages of the vehicle.

To address the stated aim, the invention consists in a method for eliminating hydrocarbon vapors generated in a fuel tank for a vehicle powertrain including at least one heat engine, by means of a canister adapted to absorb said vapors, characterized in that it includes steps consisting in:
  detecting movements of hydrocarbon vapors from said tank to said canister;
  increasing a counter value (Counter) when said vapors move from said tank to said canister;
  calculating a number (nBV) of gas volumes passing through said canister when the heat engine is started so as to reduce the value of the counter by purging said gasoline vapors in the direction of the engine.

Specifically, the movements of hydrocarbon vapors from said tank to said canister are detected by means of a calibrated valve opening signal that allows the hydrocarbon vapors to move from said tank to said canister.

More specifically, the calibrated valve opening signal is generated by a pressure value on the downstream side of the valve exceeding a threshold value.

The value of the counter is preferably decreased by tracking a discharge curve as a function of the number of gas volumes passing through said canister.

When the powertrain is hybrid, the method advantageously includes steps consisting in:
  detecting a non-thermal drive mode;
  detecting that the counter value exceeds a maximum value;
  generating a request to start the heat engine when said counter value exceeds a maximum value.

The invention also consists in a computer program including program code instructions for the execution of the steps of the method in accordance with the invention when said program is executed on one or more computers.

The invention also consists in a device for eliminating hydrocarbon vapors generated in a fuel tank for a vehicle powertrain including at least one heat engine, by means of a canister adapted to absorb said vapors, characterized in that it includes:
  means for detecting movements of hydrocarbon vapors from said tank to said canister;
  a computer connected to said detection means to increase a counter value when said vapors move from said tank to said canister;
  a valve controlled by the computer to cause a number of gas volumes to pass through said canister when the heat engine is started so as to reduce the value of the counter by purging said gasoline vapors in the direction of the engine.

Specifically, the means for detecting movement of hydrocarbon vapors from said tank to said canister include a calibrated valve, the opening of which that allows the hydrocarbon vapors to move from said tank to said canister is signaled to the computer.

More specifically, the means for detecting movement of hydrocarbon vapors include a pressure sensor on the downstream side of the valve to signal to the computer a pressure value that is representative of the opening of the valve.

The computer preferably includes a memory containing a discharge curve that makes it possible to reduce the value of the counter by tracking it as a function of a number of gas volumes passing through said canister.

Other features and advantages of the invention will become apparent when reading the following detailed description for an understanding of which reference should be made to the appended drawings, in which.

In the remainder of the description, elements having an identical structure or analogous functions will be designated by the same reference number.

Figure 1:
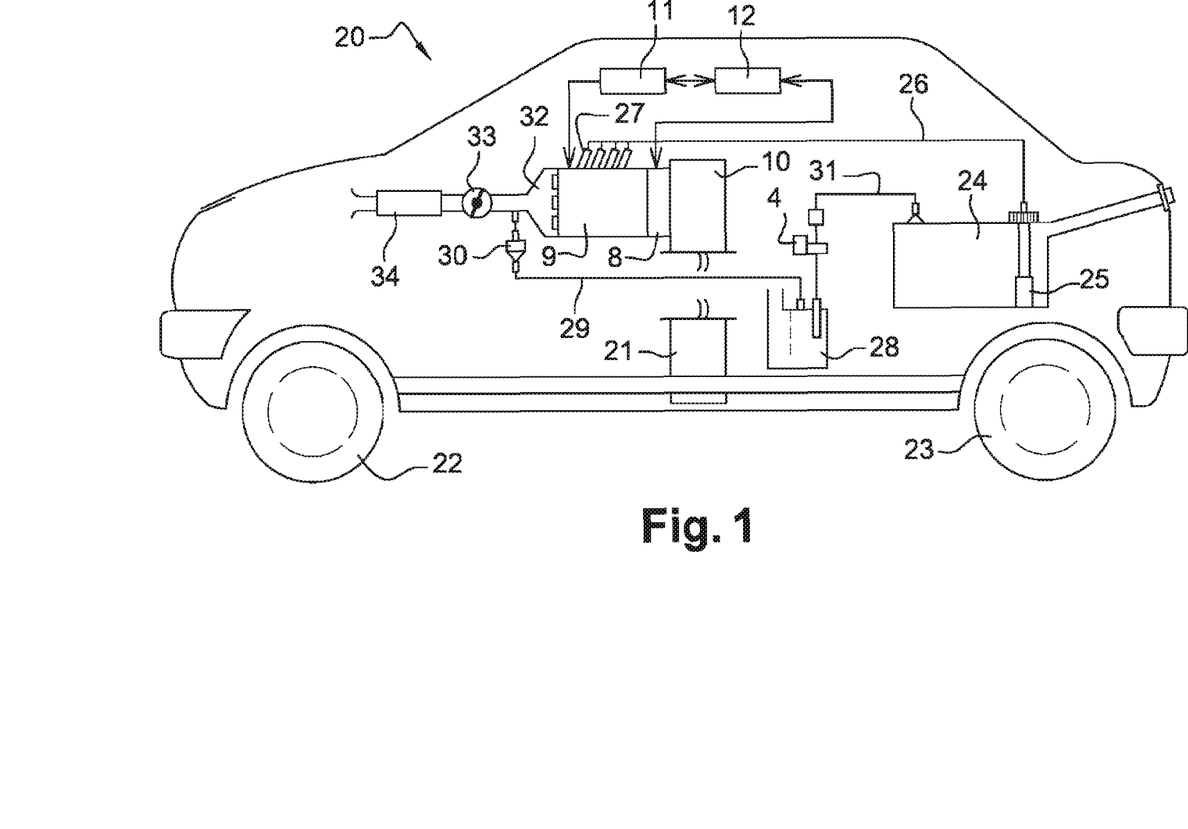
FIG. 1 is a diagram that represents a hybrid drive system for vehicles with its fuel supply circuit.

FIG. 1 shows diagrammatically a vehicle 20 equipped with a hybrid drive which, for simplicity, features a single electric machine 8 engaged with a known transmission 21 via a reducer 10. The hybrid drive also includes a heat engine 9. The heat engine 9 is engaged with the electric machine 8 and the transmission 10 or runs with no load. The heat engine 9 is controlled by an engine computer 11. A hybrid computer 12 manages the distribution of torque and power between the electric machine 8 and the heat engine 9.

The above hybrid drive is described by way of illustration only. The invention is equally applicable to other types of hybrid drive, such as those with a plurality of electric machines, for example, and/or electric machine(s) coupled to an axle 23 other than the axle 22 to which the heat engine is coupled.

A tank 24 for fuel, notably for gasoline, enables the heat engine 9 to be supplied in the manner known in itself via a pump 25, a pipe 26 and injectors 27.

A gasoline vapor absorber or canister 28 has the function of storing the gasoline vapors that are formed in the tank 24 of the vehicle 20 above the gasoline surface to prevent those gasoline vapors being rejected into the atmosphere. The air vent of the tank 24 is then routed to the canister 28 via a pipe 31. The gasoline vapors contained in the canister 28 are regularly purged in the direction of the heat engine 9 via a pipe 29 so as to burn them when the heat engine is started. The pipe 29 discharges on the upstream side of a combustion-supporting air intake manifold 32 of the heat engine 9 on the downstream side of a combustion-supporting air flow rate modulation flap 33 so that an energy effect of the gasoline vapors mixed with the combustion-supporting air is added to that of the fuel that feeds the heat engine 9 via the injectors 27. The vapors coming from the canister 28 are metered by a purge solenoid valve 30 controlled by the engine computer 11. The combustion-supporting air is moreover purified in a manner known in itself by a filter 34 disposed on the upstream side of the flap 33.

Figure 2:
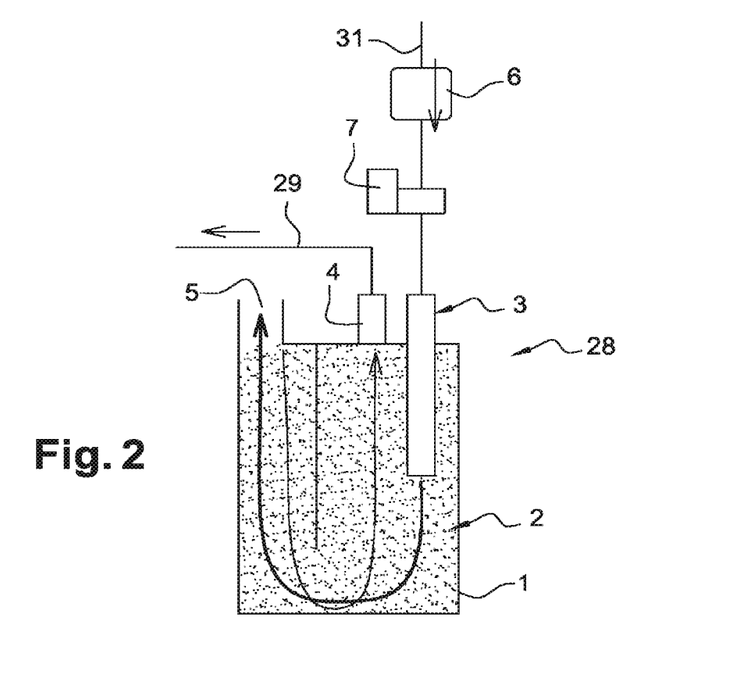
FIGS. 2 and 3 are diagrams of hydrocarbon vapor elimination devices in accordance with the invention.

As shown in more detail in FIG. 2, the canister 28 includes a body 1 consisting of an injection-molded plastic casing. The body 1 contains an absorption agent 2, notably activated charcoal. The canister is connected to the rest of the purging system via a tank tapping canula 3 connected to the pipe 31 and an engine purge tapping canula 4 connected to the pipe 29.

The canister 28 from FIG. 2 has a U-shaped architecture. During purging phases (arrow extending from the left toward the right), the vapors progress from an air vent opening 5 in the direction of the purge tapping canula 4. During charging phases (arrow extending from the right toward the left), the vapor moves from the tank tapping canula 3 in the direction of the air vent opening 5.

In the case of exclusively thermal drives, the heat engine running continuously when the vehicle is in motion, it is often possible to purge the canister by opening the purge solenoid valve 30 controlled by the engine computer 11 which takes account of this to control the regulation of engine combustion richness.

In the case of hybrid drives there are fewer purging opportunities because of a rarer or reduced operation of the heat engine. It is then advantageous to delay the charging of the canister with a low-pressure calibrated valve 6, with calibration value denoted "pt", for example. The device of the invention is noteworthy in that it is equipped with means for detecting opening and closing of the valve 6 connected to the engine computer 11, so as to detect for how long the valve is open and thus to measure a cumulative charging time that is stored in a counter in memory (not shown) of the computer 11. Various ways of detecting opening and closing of the valve 6 are possible such as, for example, equipping the valve with an integrated electrical contact that opens and closes in relation to the closing and the opening of the valve 6 or vice versa.

The detection means employed in the embodiment shown in FIG. 2 consist of a pressure sensor 7 situated on the downstream side of the valve 6. It can sometimes be simpler to provide on the one hand an individual calibrated valve and on the other hand an individual pressure sensor rather than to design a valve equipped with an electrical contact and calibrated to the required values at low cost. Moreover, a pressure value supplied by the sensor 7 is more representative of actual commencement of communication of the gasoline tank with the canister. When separate from the valve, such detection means also make it possible to dissociate the location of the pressure sensor 7 in the vicinity of the canister and of the calibrated valve 6 in the vicinity of the canister or in the vicinity of the tank.

Other detection means could be employed such as, for example, those including a flow meter for measuring a flow of gasoline vapor following the opening of the valve. Care must however be taken to use simple and robust means so as not to increase unnecessarily the cost of the device.

Figure 4:
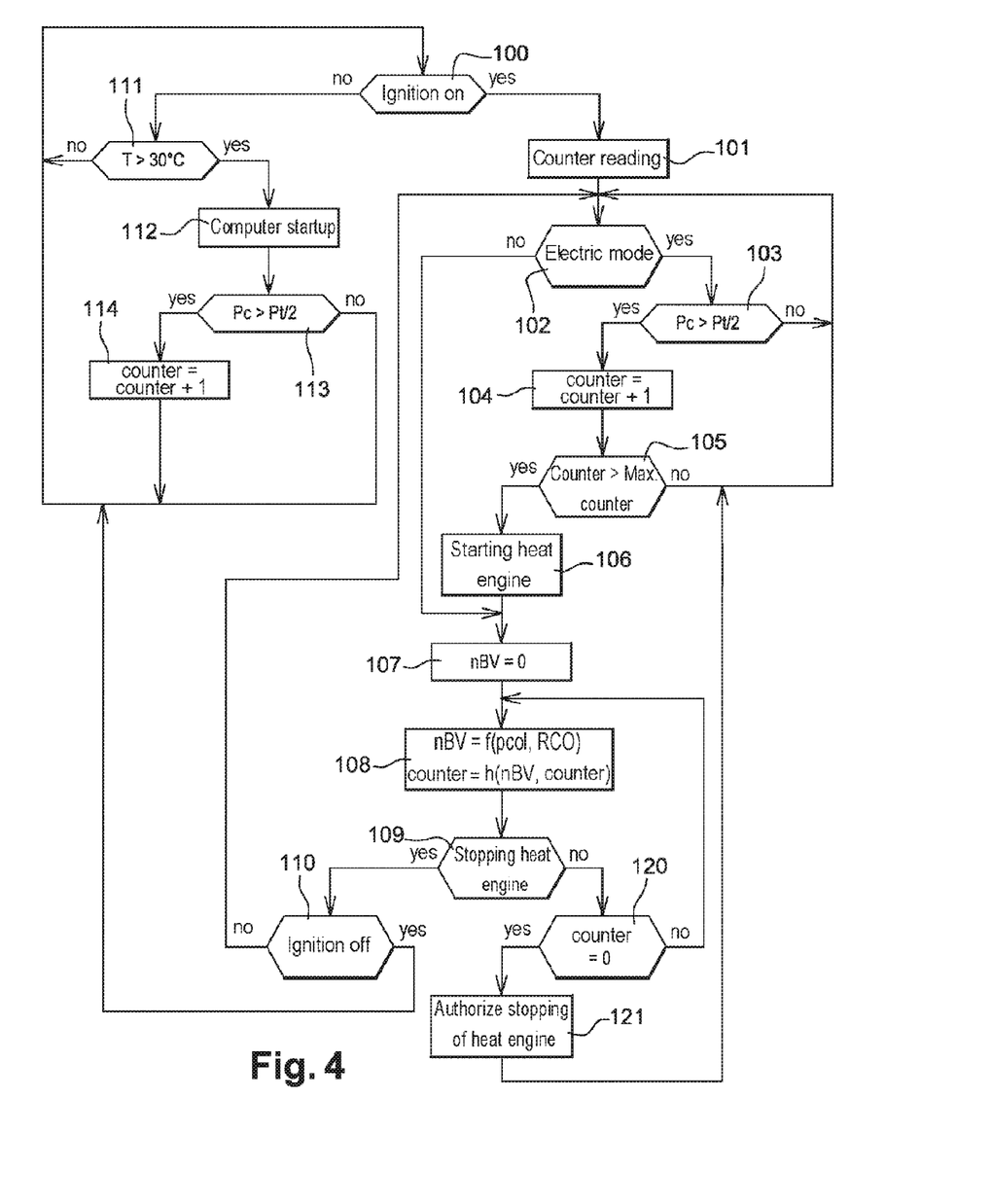
FIG. 4 is a flowchart that shows the steps of the method in accordance with the invention.

When the cumulative charging time, denoted "Counter" and updated continuously by the mechanism explained hereinafter with reference to FIG. 4, reaches a limit value corresponding to a limit charging time denoted "Counter-.max", it is considered that the canister is close to being breached. The engine computer 11 then starts the heat engine 9 to perform the purge at the earliest opportunity, there and then if in motion or when next in motion if stationary. In the event of there being obligatory electrical operation areas, for example in some future towns, there may also be provision for starting the heat engine when next moving in an area in which thermal operation is allowed.

After a purge of the canister the time counter is reset to zero if the purge is complete (approximately 20 km or purge volume of 500 BV) or to a time value corresponding to the charge of the canister when purging is stopped. There are a number of ways to estimate the state of purge of the canister once the engine is started, and the method explained hereinafter illustrates the elements common thereto that are specific to the invention. The unit denoted BV (Bed Volume, meaning the volume of the bed of activated charcoal contained in the canister) corresponds to a volume of gas passing through the canister that is equal to the interior volume of the canister, in other words to a "canister equivalent". Thus 500 BV corresponds to a volume of gas passing through the canister equal to 500 times its volume.

A computer program installed on one of the two computers 11, 12 or shared between the two computers 11 and 12 includes program code instructions for executing the steps of the method explained next with reference to FIG. 4 when the program is executed on one or more computers.

The steps of the method essentially consist in measuring and controlling the state of charge of the canister continuously on the basis of a charge-discharge curve for the canister and a number of individual gas volumes passed through the canister expressed in Bed Volumes and denoted nBV, as explained hereinafter with reference to FIG. 5. The number of individual volumes passing through the canister is easy to calculate from the pressure "pcol" in the combustion-supporting air intake manifold 32 and a degree "RCO" of opening of the valve 30. The computer already employs in a known manner the pressure "pcol" in the combustion-supporting air intake manifold 32 to control combustion in the engine, for example, without it being necessary to discuss at length the various ways for the computer 11 to obtain the value of the pressure "pcol" in the combustion-supporting air intake manifold 32, which are widely available in the literature. The computer that controls the controlled solenoid valve 30 in fact knows its degree "RCO" of opening, and if it is not the computer 11, can make it available to the computer 11 via the CAN bus.

Starting from a step 100 of detection of turning on the ignition of the vehicle, a step 101 of reading the counter is activated if the ignition has been turned on and a step 111 of temperature threshold detection is activated if the ignition has not been turned on.

The object of the temperature threshold detection step 111 is to monitor whether the ambient temperature T exceeds a temperature threshold, for example 30° C., above which it is estimated that the rate of evaporation of the gasoline increases.

The step 111 loops to the step 100 as long as the ambient temperature does not exceed the temperature threshold.

If the ambient temperature T exceeds the temperature threshold, a computer wake-up step 112 is activated to wake up the computer 11, which then executes a step 113 of monitoring opening of the calibration valve 6. If opening of the calibration valve 6 is detected by means of the pressure sensor 7, the detection by the sensor 7 of the pressure Pc at which the valve opens is preferably set at half the calibration pressure Pt. It is possible to choose calibration substantially different from Pt/2 in a range of pressures sufficiently lower than the calibration pressure to take account of the head losses generated by the circulation of the vapors when the valve is opened and sufficiently greater than zero so as not to trigger untimely detection.

The step 113 loops to the step 100 as long as opening of the valve 6 is not detected.

When opening of the valve 6 is detected, a step 114 of incrementing the counter is activated to take into account the gasoline vapor charge that results from the opening of the valve 6 as a result of the tank 24 communicating with the canister 28. After the counter is updated, the step 113 loops to the step 100.

Each looping to the step 100 in which it is detected that the ignition of the vehicle has not been turned on causes the computer 11 to go back to sleep with the aim of conserving energy. For their part the steps 100, 111 and 112 are executed by a computer that is permanently awake. In a known manner, this computer that is permanently awake is for example the computer that monitors the locking of the doors, the turning on of the ignition of the vehicle and various other events that it is beneficial to monitor in the absence of a user turning on the ignition.

The step 101 of reading the counter activated after the ignition of the vehicle is turned on makes it possible to estimate the charge of the canister.

The step 101 is followed by a step 102 of detecting the operating mode of the hybrid powertrain. Like any step of the method to which another step loops, the step 102 is activated again after a sampling period, for example one second.

A step 103 similar to the step 113 is activated if the operating mode of the hybrid powertrain is a mode other than the thermal mode, such as an electric mode, for example, or a pneumatic mode, in other words any drive mode in which the heat engine is stopped.

The step 103 loops to the step 102 as long as opening of the valve 6 is not detected.

When opening of the valve 6 is detected, a step 104 similar to the step 114 is activated to take account of the gasoline vapor charge that results from the opening of the valve 6 as a result of the tank 24 communicating with the canister 28. After the counter is updated, the step 103 activates a following step 105 of verifying the content of the counter.

As long as the content "Counter" of the counter does not exceed a maximum value "Counter.max" representative of saturation of the bed of activated charcoal in the canister 28, the step 105 loops to the step 102.

The content "Counter" of the counter overshooting the maximum value "Counter.max" activates a step 106 that consists in generating a request to start the heat engine.

After this a step 107 consists in setting to zero a number nBV of canister volumes.

When the heat engine is started, the computer 11 controls opening of the controlled solenoid valve 30 in a step 108 during which an increase ΔnBV of the number of canister volumes during a sampling period is calculated as a function of the intake manifold pressure pcol and the degree RCO of opening of the valve 30.

$$\Delta nBV := f(pcol, RCO)$$

This calculation applies the known laws of fluid mechanics that yield a flow rate as a function of the pressure difference between the canister 28 and the intake manifold inlet 32 on the one hand and the head losses on routing the vapors from the canister 28 to the inlet of the intake manifold 32. The head losses for each degree RCO of opening of the valve 30 being reproducible, it suffices to measure them in a powertrain test phase and to set them out in an associative table in memory of the computer 11 to enable it to retrieve them afterwards during the service life of the vehicle.

In step 108, the number nBV of canister volumes is then updated by adding its increase ΔnBV to its value previously obtained using the formula:

$$nBV := nBV + \Delta nBV$$

Figure 5:
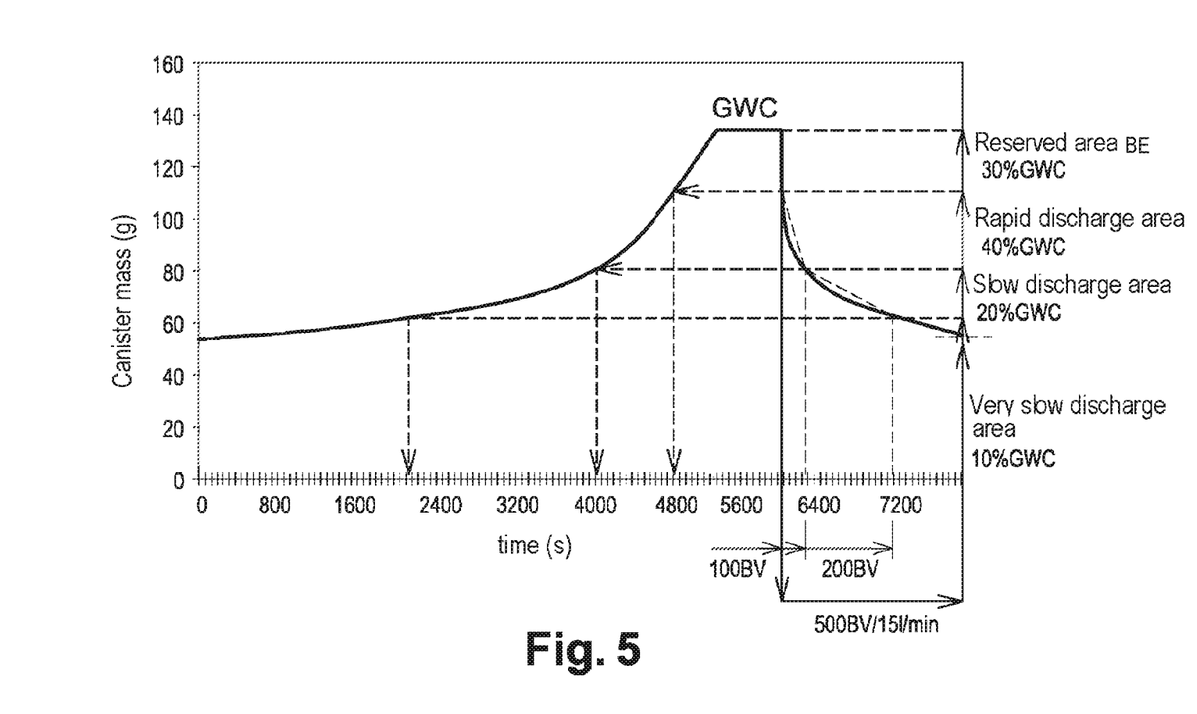
FIG. 5 is a graph of the evolution over time of the mass of the canister during charging and discharging.

In the FIG. 5 graph, the values of the counter plotted by way of illustration from 0 to 5600 on the abscissa (time) axis correspond to those obtained in one of the steps 104 or 114 during the charging with gasoline vapors of the canister 28 the mass of which plotted on the ordinate axis varies accordingly from substantially 55 g to substantially 140 g. The increasing curve in this portion of the graph is limited by a GWC (Gasoline Working Capacity) value that corresponds to the gasoline absorption capacity of the canister (this is the English-language term) 28. When the mass of the canister reaches the sum of its minimum value under steady state operating conditions and the GWC value, the gasoline vapors passing through it can no longer be absorbed and as time advances the mass of the canister remaining constant, the vapors exit via the air vent opening 5 if they are not eliminated via the purge tapping canula 4.

The evolution curve of the mass of the canister 28 varies from one type of canister to another as a function in particular of the volume of activated charcoal or other absorbent material that it contains. The trend is substantially always the same, however, and only the values change, which values are given for each type of canister by its manufacturer, where applicable verified and/or tweaked during test phases.

In the example illustrated by FIG. 5, a value Counter.max of the order of 5200 could be taken but it may be preferable to maintain a safety margin of 30% of GWC, for example, corresponding to a reserved area BE here between 110 g and 140 g inclusive. The point on the curve with the ordinate at 110 g then gives on the abscissa axis a value Counter.max of the order of 4800.

The decreasing curve in the right-hand portion of the graph gives the mass evolution in the discharge phase of the canister. The slope as a function of the number of BY passing through the canister is proportional to the charge of the canister. For example, 100 BV is sufficient to decrease the mass from 110 g to 80 g whereas at least 200 BV is necessary to decrease the mass from 80 g to 60 g. Here 500 BV, corresponding in the case shown to 15 liters per minute, is necessary to achieve the minimum mass under steady state operating conditions of slightly greater than 50 g. The minimum mass under steady state operating conditions generally corresponds to the mass of the canister when empty to which is added a residual mass of gasoline vapor trapped in the microscopic pores of the absorbent material and that cannot be purged.

The computer 11 that can access in memory each of the charge and discharge curves of the type of canister to which the managed canister belongs can then in step 108 update the value of the counter "counter=h(nBV, counter) on the graph in the following manner.

The value of the counter "counter" at the start of the step 108 enables the computer to position itself on a first point of the increasing curve in the charging phase that gives the mass of the canister before purging nBV. This first point corresponds to a second point of identical mass on the decreasing curve in the discharging phase that after purging nBV leads to a third point along the decreasing curve corresponding to a reduced mass of the gasoline vapors that have been purged. This third point corresponds to a fourth point on the identical decreased mass increasing curve. The fourth point then gives on the abscissa axis a lower counter value "counter" on exit from the step 108.

Following the step 108, a step 109 consists in verifying if stopping the heat engine risks interrupting the purging process initiated by the step 107.

If the heat engine is not stopped, a step 120 consists in verifying if the counter is at zero. If the counter is at zero, it is no longer necessary to purge the canister 28 and the method then allows the heat engine to be stopped in step 121 before looping to step 102 to verify if the drive system has switched to electric mode.

If the counter is not at zero in step 120, it is necessary to continue the purging of the canister and the step 120 then loops to the step 108 for an additional iteration in order to continue the purging of the canister.

If stopping of the heat engine is detected in step 109, a step 110 consists in verifying if the stopping of the heat engine is the result of turning off the ignition, for example because the user has arrived at their destination or for other reasons. In the event of turning off of the ignition being detected in step 110, the method loops to the step 100.

If turning off of the ignition is not detected in step 110, the method loops to the step 102 to verify if the stopping of the heat engine is the result of switching to electric mode.

If, following turning on the ignition of the vehicle being detected in step 100 or in the case of the electric mode detected beforehand in step 102, the heat engine has started for reasons external to the method, for example following detection of a low charge in the traction battery by the hybrid computer 12 or for other reasons, the absence of electric mode detected in step 102 then branches the method directly to step 107 to purge the canister preventively without the counter necessarily reaching its maximum value.

It is possible to update the charge counter as explained above on each iteration of the step 108 or after the latest iteration of the step 108, for example at the end of a journey.

Figure 3:
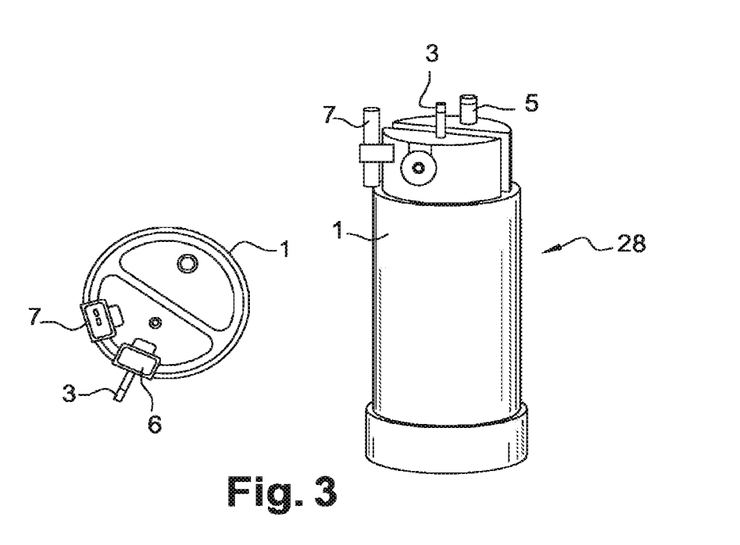

FIG. 3 shows an example of a hydrocarbon vapors elimination device in which the calibrated valve 6 and the sensor 7 are integrated into the body 1 of the canister 28. The principal advantages are the saving of space and the increase of reliability resulting from the reduction of the number of interfaces. The quality of the estimate is also improved because the pressure sensor is near the valve and the canister.

The proposed solution necessitates the computer of the heat engine to be permanently awake or to be awoken regularly to effect the acquisition of information from the pressure sensor mounted on the canister. For example, for a meaningful ambient temperature that causes opening of the calibrated valve 6 (for example T>30° C.), the passenger compartment computer, which measures the temperature of the air, will first wake itself up and command the heat engine computer to wake itself up in turn so as to acquire it.

For each type of canister it is preferable to measure the envelope breaching time for different temperature conditions inherent to the sales market of the vehicle.

The FIG. 3 embodiment in which the canister includes the sensor and the integrated valve may be applied to any gasoline driven vehicle with semi-pressurized evaporation system.

The invention claimed is:

1. A device for eliminating hydrocarbon vapors generated in a fuel tank of a vehicle powertrain including at least one heat engine, by a canister adapted to absorb said vapors, comprising:
   means for detecting movements of hydrocarbon vapors from said tank to said canister;
   a computer connected to said detection means to increase a counter value when said vapors move from said tank to said canister; and
   a valve controlled by the computer to cause a number of gas volumes to pass through said canister when the heat engine is started so as to reduce the value of the counter by purging said hydrocarbon vapors in a direction of the engine.

2. The device as claimed in claim 1, wherein the means for detecting movement of hydrocarbon vapors from said tank to said canister include a calibrated valve, and opening of the calibrated valve that allows the hydrocarbon vapors to move from said tank to said canister is signaled to the computer.

3. The device as claimed in claim 2, wherein the means for detecting movement of hydrocarbon vapors include a pressure sensor on a downstream side of the valve to signal to the computer a pressure value that is representative of the opening of the valve.

4. The device as claimed in claim 1, wherein the computer includes a memory containing a discharge curve such that the computer is configured to reduce the counter value by tracking the discharge curve as a function of a number of gas volumes passing through said canister.

5. A method for eliminating hydrocarbon vapors generated in a fuel tank of a vehicle powertrain including at least one heat engine, by a canister adapted to absorb said vapors, comprising:
   detecting movements of the hydrocarbon vapors from said tank to said canister;
   increasing a counter value when said vapors move from said tank to said canister; and
   calculating a number of gas volumes passing through said canister when the heat engine is started so as to reduce the value of the counter by purging said hydrocarbon vapors in a direction of the engine.

6. The method as claimed in claim 5, wherein the movements of hydrocarbon vapors from said tank to said canister are detected by a calibrated valve opening signal that allows the hydrocarbon vapors to move from said tank to said canister.

7. The method as claimed in claim 6, wherein the calibrated valve opening signal is generated by a pressure value on a downstream side of a valve exceeding a threshold value.

8. The method as claimed in claim 5, wherein the value of the counter is decreased by tracking a discharge curve as a function of the number of gas volumes passing through said canister.

9. The method as claimed in claim 5, wherein the powertrain is hybrid, and the method further comprises:
   detecting a non-thermal drive mode;
   detecting that the counter value exceeds a maximum value; and
   generating a request to start the heat engine when said counter value exceeds a maximum value.

10. A non-transitory computer readable medium storing a program that, when said program is executed on one or more computers, causes the computers to execute the method as claimed in claim 5.

\* \* \* \* \*